May 31, 1966  H. PAPST  3,253,475
GEAR WITH HYDRAULIC SPEED SELECTION
Filed Sept. 11, 1963
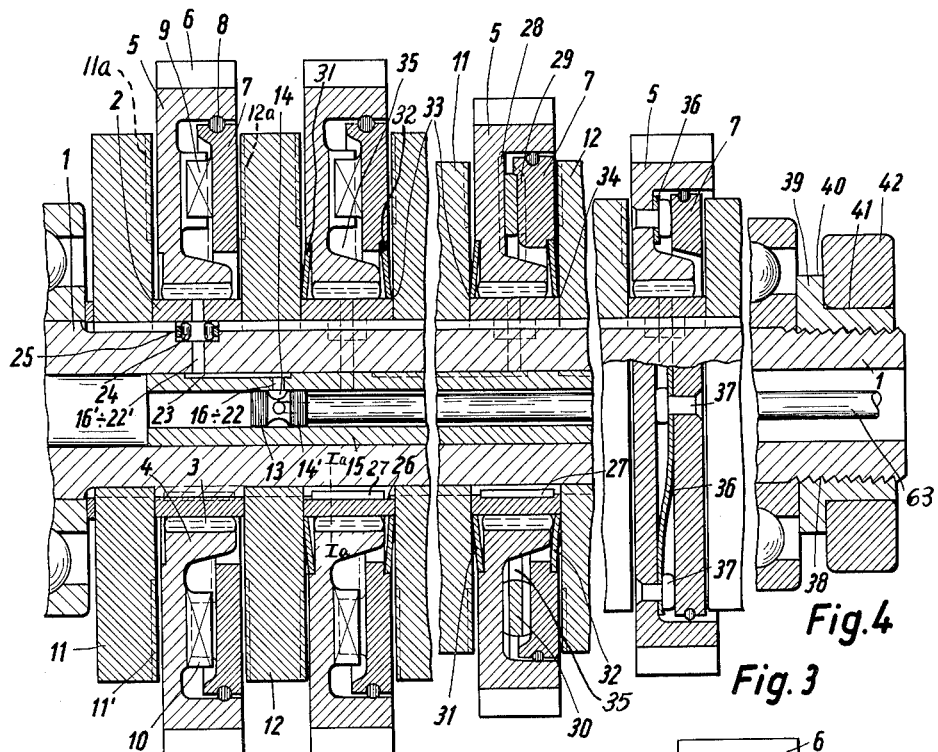
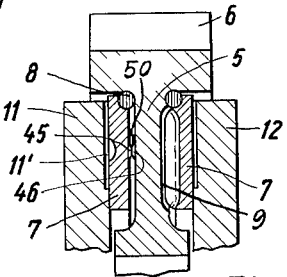
Inventor:
Hermann Papst
by
Michael S. Striker May 31, 1966  H. PAPST  3,253,475
GEAR WITH HYDRAULIC SPEED SELECTION
Filed Sept. 11, 1963                    2 Sheets-Sheet 2

Inventor:
Hermann Papst
by
Michael S. Striker

United States Patent Office

3,253,475
Patented May 31, 1966

3,253,475
GEAR WITH HYDRAULIC SPEED SELECTION
Hermann Papst, St. Georgen, Black Forest, Germany
Filed Sept. 11, 1963, Ser. No. 308,622
14 Claims. (Cl. 74—364)

The invention relates to a gear transmission in which the driving shaft and the driven shaft are connected by gear wheels and in which the speed is selected by hydraulic means and refers more particularly to a design of the gear box and of its associated parts.

It has already been proposed to use the above mentioned type of gear transmission for motor cars but the hitherto known embodiments of such gear-box suffer from so many disadvantages that up to now they have not been much used.

It is an object of the invention to provide an improved gear transmission which yields more satisfactory results.

It is a further object of the invention to provide for an arrangement of the type mentioned which is comparatively simple in its structure and capable of practical realization.

It is a still further object of the invention to provide an improved system for selecting the speed and to provide also control means which automatically prevent damage or abnormal wear of the clutch faces by wrong operation.

In accordance with the present invention in a gear transmission with hydraulic speed selection in which the driving shaft and the driven shaft are connected by gear wheels, several gear wheels run freely on one of said shafts and coupling discs are fixed to the same shaft between said toothed wheels. The said free running gear wheels are provided with at least one hydraulic pressure cylinder with a tightly inserted and axially movable piston are also provided with guiding means which secure said piston against turning relative to the surrounding toothed wheel so that the sealing means between used to seal the sliding joint between the periphery of said piston and the bore of said cylinder substantially unstressed.

In an embodiment of the invention one side of each of several toothed wheels is provided with a hydraulic pressure cylinder and axially movable piston and the other side is provided with a coupling face.

In another embodiment of the invention each of both sides of several toothed wheels are provided with at least one hydraulic pressure cylinder and axially movable piston.

In a further embodiment of the invention each side of each gear-wheel is provided with at least one hydraulic pressure cylinder in which is inserted on one side an axially movable piston and on the other side a substantially immovable piston fixed to the toothed wheel at least one point, preferably along a narrow annular zone so that it is capable of resilient engagement with the adjacent face of a fixed coupling disc which is made slightly resilient when said pressure cylinder is operated.

Other objects of the invention are directed to improve the oil pressure system which operates the hydraulic pistons. Therefore the main shaft of the gear, carrying the loose running toothed wheels and also the fixed coupling discs is provided with races penetrated by oil bores and joint rings tightly surrounding the inner ends of the said bores are inserted into annular grooves of said shaft surrounding the outlets of oil feeding channels arranged within said shaft.

Furthermore the toothed wheels have springs operating to disengage the annular pistons and the toothed wheels from the coupling discs and serving as auxiliary means for sealing the oil pressure chamber.

It is useful to provide either the toothed wheels or the annular pistons and or the clutch discs with grooves communicating with the outside for draining the oil and also with annular faces serving for sealing the oil pressure chamber.

A still further improvement is obtained when the oil pressure chambers of idle running gear wheels communicate with the outside and said communication is interrupted only when the coupling face of a hitherto idle running gear wheel is pressed against the adjacent clutch disc. In this way the pressure chamber of idle running gear wheels is automatically vented.

For obtaining excellent lubrication without additional sealing problems, the anti-friction bearings, preferably needle bearings, of idle running gear wheels are arranged within said oil pressure chamber, the oil being fed through a bore of the inner race.

It is advantageous to feed the oil to the selected gear wheel by means of a control sleeve containing a piston valve which is inserted into the hollow main shaft, said control sleeve having on its outer side oil channels that connect its inner oil bores with oil bores in said shaft communicating with the oil pressure cylinders of said gear wheels.

To reduce friction the control valve is provided with fine grooves having a cross-section of about 0.001 to 0.05 square millimeters preferably arranged like a screw thread.

It is a further purpose of the invention to combine the gear box with the other parts of a motor car in a specific way thus obtaining advantages for the drivers of said cars.

For this purpose gear shifting is prevented by a lock blocking the gear-shift linkage of a motorcar, and the lock is coupled with the clutch between engine and said gear box so that by disengaging the clutch the hitherto locked gear-shift linkage is released.

To protect the coupling faces on the piston and the corresponding coupling disc from engaging under load, there is provided an automatic electromagnetic coupling device which is controlled by two opposing impulse-generators connected to the shafts of the engine and the gear transmission respectively.

Excellent results are obtained by connecting the automatic electromagnetic coupling device with the two tacho-generators so that the difference of the voltages supplied by said tacho-generators is about zero at equal numbers of revolutions and the clutch between engine and gear which immediately disengages when starting to shift the gear, will automatically be closed again. Preferably said disengaging and closing is controlled by the same switch.

According to a more specific feature of the invention the gear is connected to a control device which supplies electric current to an electromagnetic operating clutch between engine and gear box and to the starter motor only when at least one of said gear wheels is already coupled to the corresponding coupling disc.

Other and further objects of the invention are directed to the method of operating or controlling the gear box by axially shifting the steering wheel of the motorcar. In such cases it is useful to provide a lock, that prevents the steering wheel from being axially shifted but is released when the clutch is disengaged.

It is very convenient for the driver to connect the base of the steering column to the piston of an oil damper with adjustable delay.

When using an electromagnetic coupling device which is controlled by two opposing tacho-generators connected to the shafts of motor and gear respectively, it is advisable to provide a signal lamp which indicates when the shafts of motor and gear respectively are running at about the same number of revolutions.

The performance of a gear according to the invention is further improved if the guiding means for the pistons have spur gear teeth with inclined wedge-shaped flanks, thus increasing the force acting at the clutch faces.

The features which are considered as characteristic for the invention are set forth in particular in the appended claims. The invention itself, however, both as to its construction and its method of operation together with additional objects and advantages thereof, will be best understood from the following description of a specific embodiment when read in connection with the accompanying drawings comprising FIGURES 1 to 9, in the several figures of which like components are designated by like reference numerals and in which:

FIG. 1 is a sectional view of the main parts of a gear according to the invention, the toothed wheels being shaped as pressure cylinders with annular pistons.

FIG. 1a is a fragmentary cross sectional view of a detail of FIG. 1 taken of line Ia—Ia.

FIG. 2 is a sectional view of a detail of a slightly modified embodiment of the invention, in which the toothed wheel and the annular piston having wedge-shaped guiding means and are connected shiftably by means of an intermediate ring with stamped counter surfaces.

FIG. 3 is a sectional view of a detail of another modification of the invention, the toothed wheel and ring piston connected by a leaf spring.

FIG. 4 is a sectional view of the end of the shaft with a nut, the latter pressing together under high pretension the coupling discs with the bearing rings.

FIG. 5 is a sectional view of a part of a toothed wheel, both flanks of which are shaped as pressure cylinders.

Figure 6:
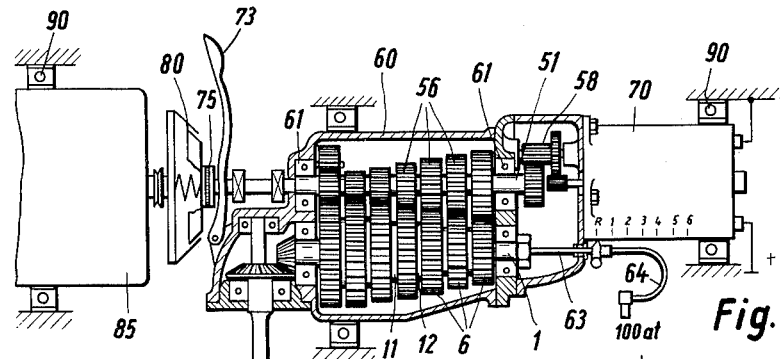
FIG. 6 is a partly sectional diagram of a gear box with six gears and reverse gear and its associated parts, an automatically shifting reduction gear for the starter motor.

In FIG. 1, anti-friction bearing rings 2, also smooth on the inside, are attached to the splined toothed shaft 1. The needles 3 carry the outer race 4 which forms the hub of a gear wheel 5 having teeth 6. An annular piston 7 fits closely within a cylindrical lateral recess in gear 5, the peripheral joint being sealed by a sealing ring 8. Drivers 9 formed on the piston mesh into gaps between corresponding drivers 10 formed on gear 5. These drivers prevent any substantial relative rotation of annular piston 7 and gear 5, so that these components are capable of relative axial movement, but are secured against any amount of relative turning which might damage sealing ring 8. On splined shaft 1 there are fixed coupling member shown to the discs 11, 12, which are internally toothed to engage the splines on the shaft and have laped faces perpendicular to the axis, against which the clutch faces of gear 5 and piston 7 bear when overcoming the pressure of disted annular springs 31, 32.

Oil under pressure is led to the various gears, each of which is similarly constructed, by way of a piston valve 13, to a groove 14 in which the oil is conducted by way of a tube 63, by the axial movement of which the position of the valve 13 may be altered. Valve 13 works within a sleeve 15, which has a tight fit in the internal bore of shaft 1. Gear 5 is coupled to a clutch disk by moving valve 13 to the position shown, in which supply groove 14 is aligned with a radial bore 16 through sleeve 15. At its outer end bore 18 enters a longitudinal groove 23 in sleeve 15, through which the oil is conducted to a further radial bore 16 in the wall of shaft 1, which is aligned with a hole passing radially through the inner race ring 2 of the bearing of gear 5. The oil then flows radially outwards between the pairs of clutch faces on either side of the gear wheel and so escapes. The gap between each pair of clutch faces is sufficiently narrow, however, to throttle the flows so that oil is forced into the space between gear 5 and piston 7, so that these components are urged apart in opposite axial directions. This action reduces the gap through which the oil can escape and thus increases the throttling effect causing a pressure drop, until finally the clutch surfaces are fully engaged. This action is in practice found to be very rapid. Grooves 11a, 12a are provided on the coupling faces of disks 11, 12.

The critical sealing points of splined tooth shaft 1 are sealed by a sealing ring 24 fitted into a groove around the oil bore. This ring, e.g. of oil proof rubber, is vulcanized into a metal ring 25. Therefore the rubber cannot escape into the keyways of splined toothed shaft 1. The outer diameter of ring 24 is slightly reduced when the anti-friction bearing ring 2 slide upon splined toothed shaft 1; thus the rings seal more intensely with increasing oil pressure. As shown in FIG. 1a, the anti-friction bearing rings 2 have inside a semi-circular slot 26. A key pin 27 fixes the position of the oil bore 16' in alignment with rings 24, 25 in splined shaft 1.

Control valve 13 is very closely fitted into control sleeve 15. Tests have shown that the control valve begins to score at once in a very narrow sleeve. This is caused by the fact that in small gaps there cannot exist a bearing oil film. The leakage oil pressure accidentally increased at one side of the piston will press the opposite side of it against the cylinder wall. In the absence of an oil-film there will instantly be scoring and scratching of the bore. On the other hand there would be too much leakage oil in case of a larger gap.

This is prevented by fine, hardly visible grooves 14' on the sliding sealing surfaces of control valve 13. These grooves cause a pressure equalisation around the circumference of the control valve, which eliminates unbalanced lateral contact pressure. Furthermore, by arranging the very fine grooves helically like a thread, very small oil impurities cannot collect and are flushed out. The quantity of leakage is not increased by the grooves as the small diameter and considerable length of the fine thread grooves cause a substantial hydraulic resistance.

In FIG. 2 toothed wheel 5 is provided with radial teeth 28. Annular piston 7 has similar teeth 29. Between parts 5 and 7 a ring 30 of, e.g., aluminium or hardened plastic material is arranged. The roof-shaped teeth 28, 29 may be pressed into ring 30. The teeth 28, 29 may have an unexact shape. Therefore they may be fabricated by pressing or forging. Owing to the wedge-shaped faces of the teeth 28, 29 and ring 30 the pressure between annular pistons 7 and toothed wheels 5 against the edges and flanks of the coupling discs 11 and 12 is increased for any slight relative movement yields increased axial pressure. Therefore a lower oil pressure can be used.

Ring 30 fills to a great portion of pressure chamber 35 between the 5 and ring piston 7, so that the centrifugal force has only a small effect on the small quantity of oil in the chamber dished. The releasing springs 31, 32 may therefore be weak. They are seated in grooves of the gear wheels 5 and annular pistons 7 and are held on by friction without wear and tear. The inner edges 33, 34 of the plate springs 31, 32 slide along the flanks of coupling discs 11 and 12. The oil between the gear wheels 5 and the coupling disc 11, or annular pistons 7 and coupling disc 12 respectively, tends to form parallel layers which cause parallel running even when helical-gear wheels 5.

In FIG. 3 the gear wheels 5 are connected with the annular pistons 7 by leaf springs 36 riveted to one and the other component alternately. They transmit torque by way of rivets 37. In consequence of the alternately protruding rivet heads, the leaf springs 36 are loaded with a certain initial stress so that the annular pistons are retracted.

FIG. 4 shows the shaft end 1 with thread 38 and nut 39 with wrench head 40. In order to get the maximum tension, after nut 39 has been tightened as far as possible, ring 42 has to be pressed or shrunk on projection 41. In consequence of the slope of the profile of the thread formed on parts of 38 and 39, the radial compression of cylindrical projection 41 effects an increase of tensile stress in splined toothed shaft 1. Ring 42 is preferably made of hardened aluminium alloy or beryllium copper, so that in consequence of the higher thermal expansion as compared with the shaft, nut 39 can be made loose by warming up.

FIG. 5 shows a symmetrically shaped gear wheel 5 with annular pistons 7 built in on either side. The annular pistons 7 are made very thin here, e.g. of a sheet metal part with projecting drivers 9. The central wall of gear wheel 5 has corresponding drivers 10. One annular cooperating with projection 46 on the gear piston 7 is welded on to a ring-shaped projection 45. Joint 50 situated between gear wheel 5 and annular piston 7 has the effect that the left annular piston is uniformly pressed against coupling disc 11 by the oil under pressure.

FIG. 6 shows a six stage gear with an additional reversing gear. Shaft 1 carries the loose by running gear wheels 5, as explained with reference to FIGS. 1–5, while shaft 51 carries the fixed wheels 56. The shafts run in antifriction bearings 61 within the gear box 60. A reduction gear with free-wheel or automatic ratio change connected with the starter motor 70 meshes with a gear at the free end of shaft 51. The other end of shaft 51 is connected with the combustion engine 85 by way of the inner part of clutch 80. The whole device is carried by vibration damping connectors 90. Shaft 1 drives wheel 100.

The clutch pedal 72, 73 disengages clutch 80 by way of the thrust bearing 75. Tubular rod 63 of control valve 13 is fed through a flexible tubing 64 with oil from pressure oil tank 67.

Figure 7:
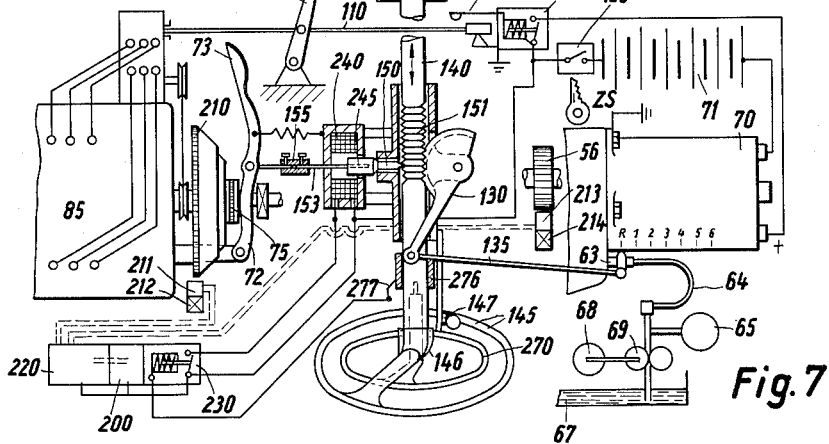
FIG. 7 is a partly sectional diagram of a gear according to FIG. 6 and its associated parts and a safety device to prevent a gear-changing underload, the shifting being done by means of an axiably movable steering wheel after disengagement of the main clutch.

In the embodiment of FIG. 7 a toothed wheel 210 is fixed to the flywheel of an internal combustion engine 85. Close to this toothed wheel are arranged an electromagnet 212 with coil 211 and a core. In the gear box 60 there is also an electromagnet 214 with a coil 213 and a core impulse generators 212, 214 located opposite a toothed wheel 56. The voltages produced are due to the flue variations caused in the cores by passing gear teeth are supplied to an adjustable twin amplifier 220. Then these alternating voltages are rectified. Both voltages operate in series in opposite direction on winding 204 controlling relay-contacts 207 and 208, shown in FIG. 8, which control through contactor 230 the solenoid 240. Its core 245 is fixed on the connecting rod 153 extending between lock pawl 150 and clutch lever 72. When the lock pawl is engaged in a notch 151 of the steering column there is a small gap between lever 72 and thrust bearing 75 so that the springs in the engaged clutch 80 keep this lock engaged under normal operating conditions.

When solenoid 240 is energized lock pawl 150 is disengaged and simultaneously clutch 80 is opened by clutch lever 72 by means of thrust bearing 75. Coupling lever 72 can also be moved by means of clutch pedal 73. Since lock 151, 150 is released, steering column 140 with steering wheel 145 is now movable axially up and down. During the clutching of another gear wheel 5 this one is loaded only for a very short time and moderately by the clutch faces. Only shaft 51 together with its associated parts needs to have its speed changed to the number of revolutions corresponding to the actual engine speed. The power consumed by slippage between the clutch 5, 7, 11, 12 is very small since the clutch is engaged only when shaft 51 is synchronized with the engine.

The automatic clutch control by means of the electric devices 212, 214, 220, 200, 230, 240 requires the disengagement of lock 150, 151 and clutch 80 before changing the gear. To effect the disengagement tension solenoid 240 receives a current impulse. This is done by means of a simple manual switch switching solenoid 240 in for a short time or by means of relay 230 energized if impulse generators 212, 214 respond to different rotary speeds of the engine and shaft 51. The switch is suitably shaped as a ring 270 similar to a horn ring and can be pressed down by a thumb to close a switch in the circuit of solenoid 240, see FIG. 9. Rack teeth 151 on steering column 140 mesh with a gear segment 130 pivotally connected with a linkage rod 135 which shifts the tubular rod 63 between positions in which valve 13 supplies pressure oil to different gear wheels 6 so that the transmission ratio between shafts 51 and 1 is varied. The steering wheel with its column is pushed down or pulled up and thus each desired gear can be set. Upon accelerating or slowing of the engine, clutch 80 engages automatically when the speed of the engine becomes equal to that of revolutions of the gear shaft since impulse generators 212, 214 are synchronized.

To shift the gear stages there can be provided, instead of the movable steering wheel, a gear-shift lever mounted on the steering column with a handle arranged close the steering wheel.

According to another modification of the invention the steering wheel column can operate a piston of an oil damper 250 in an oil cylinder of steering casing 260, thus preventing changing into a widely different gear.

For the reverse gear there may be provided an especially locked notch position which has additionally to be released. Thus, unintentional shifting into the reverse gear is impossible.

Figures 8, 9:
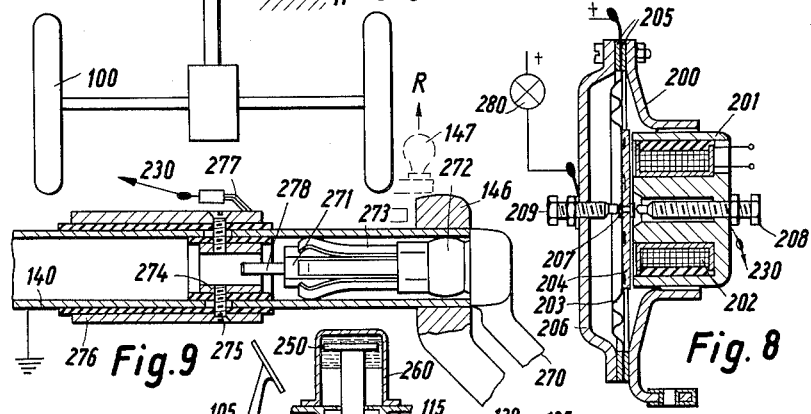
FIG. 8 is a sectional view of a device serving as switching relay for the exact control of shifting gears when there is no voltage difference in the associated control circuit and the current is zero.
FIG. 9 is a sectional view of a detail of FIG. 7, showing the arrangement of a contact at the steering wheel on a steering column ending in a damping cylinder.

FIG. 8 shows a section of a type of relay suitable for use as relay 200. A cup-shaped magnet 201 of low-remanence iron with a coil 202 is fixed by screws to the housing 200. Diaphragm 203 with armature disc 204 is fixed to the casing 200 by insulating rings 205 and a cover 206. Diaphragm 203 is provided on both sides with contacts 207 of precious metal. The cup-shaped magnet 201 is arranged so that there is an extremely small air gap between the armature disc 204 and this cup-shaped magnet which is maintained by a layer of varnish. After the fine adjustment of the air gap, the contact screw 208 in the core of the cup-shaped magnet 201 is so adjusted that diaphragm contact 207 makes contact with contact screw 208 already at very low current in coil 202 caused by different numbers of revolutions of shaft 51 and gear 56 producing impulses in coil 213. The pressure intensifies with increasing difference in voltage. Therefore the contacts 207, 208 are only opened during a very small difference of the numbers of revolutions. The effect of relay 200 is therefore that only in the range of the same number of revolutions the solenoid 240 is disconnected by contactor 230. Clutch 80 closes automatically when lever 72 is released from thrust bearing 75.

As soon as clutch 80 is closed both generated voltages are compulsory equalized. Therefore relay 200 cannot be actuated unless clutch 80 is operated by means of switch 270, relay 230 and solenoid 240 to disengage shaft 51 from engine 85.

As long as no current is exciting relay 200 diaphragm contact 207 is just touching contact screw 209 and the small indicator lamp 280 is energized. This lamp also indicates whether the main switch is closed and when driving the car this lamp also indicates that the above mentioned shafts are coupled.

If a magnetic powder clutch is used, relay 230 is controlled in reverse sense by means of diaphragm contact 207 and contact screw 209.

The above described membrane relay has the remarkable advantage of being shockproof and operating with a very small gap and high sensitivity. A high sensitivity makes it possible to use a jaw clutch 80 instead of the friction clutch shown in FIGS. 6 and 7, for when using a device according to the invention the gear is changed only at very small relative speed and without requiring the attention of the driver.

FIG. 9 shows the upper end of steering column 140 and the hub of steering wheel 145 in which the contact ring 270 is fixed by means of a hexagonal shaft 271. Contact ring 270 therefore can be operated by pressure at any spot. Collar ring 272 is so shaped, that leaf springs 273 resiliently engage the hexagonal shaft 271.

In this way contact ring 270 and its shaft are centered. At the end of this shaft contact pin 278 enters into the insulated contact ring 274 within steering column 140. This contact ring 274 is connected by means of countersunk screws 275 to an insulated cup-shaped slip ring.

Contact spring 277 is connected to relay 230 which serves to release notching lock 150, 151 by means of solenoid 240.

As compared with the known gear transmissions with hydraulic speed selection, the advantages and features of the invention are summed up as follows.

(1) The clutch-operating piston can be provided with a relative large diameter.

(2) The whole available surface is actually used to produce the pressure and no forces working in the opposite direction and thus reducing the pressure, can be produced as in a bellows.

(3) No soldering or clamping of diaphragm discs is necessary to seal the piston.

(4) Diaphragms liable to easy deformation are avoided.

(5) The oil pressure can be substantially reduced as compared with a diaphragm-bellow-arrangement because there are no opposing forces on opposing surfaces of the bellows folds.

(6) The sealing surfaces can more easily be controlled.

(7) The clutch cannot slip and the arrangement is readily applicable to motorcars as only little space is necessary and the costs are small.

(8) Each gear which after a gear change no longer transmits the power will immediately be disengaged, for the oil pressure is released by the movement of the piston valve and the subsequently opening gaps between the clutch surfaces. The gear-wheel then runs on the antifriction bearings. The gear is therefore suitable for arrangements in which the motorcar may be driven by the electric starter motor when the clutch is disengaged.

(9) Owing to the comparatively low oil pressure it is extremely easy to move the piston valve which controls the gear-changing so that especially in connection with the steering wheel the gear-changing requires only a small force of about 3 kgs. for moving the piston valve at an oil pressure of 100 atmospheres.

(10) By using impulse-generators with opposing voltage, an automatic electric coupling with electrical control of the synchronization is effected, thus making possible a completely foolproof gear changing.

I claim:

1. In a gear transmission, in combination, a shaft; a pair of coupling members secured to said shaft axially spaced from each other; at least one gear element mounted on said shaft for free rotation and located between said coupling members; at least one piston element mounted in said gear element and forming a chamber with the same; means on said gear element and piston element connecting the same for relative axial movement and for turning movement with each other; and means for supplying a pressure fluid into said chamber whereby at least one of said elements is moved in axial direction to engage the adjacent coupling members so that said gear element is coupled with said shaft.

2. In a gear transmission, in combination, a shaft; a set of coupling members secured to said shaft; a set of gears mounted on said shaft for free rotation and for limited axial movement, and located between a pair of adjacent coupling members; at least one piston mounted in each gear and forming a chamber with the same; first and second means on each gear and on each respective piston, respectively, engaging each other for connecting the same for relative axial movement and for turning movement with each other; and means for selectively supplying a pressure fluid into each of said chambers whereby the respective gear and piston move apart in axial direction to engage the adjacent coupling members so that the respective gear is coupled with said shaft.

3. In a gear transmission, in combination, a shaft; a set of coupling members secured to said shaft; a set of gears mounted on said shaft for free rotation and for limited axial movement, and located between a pair of adjacent coupling members, each gear having a cylinder recess on one side and a coupling face on the other side thereof; at least one annular piston mounted in each gear in the respective cylinder recess and forming a chamber with the same; first and second driver means on each gear and on each respective piston, respectively, engaging each other for connecting the same for relative axial movement and for turning movement with each other; and means for selectively supplying a pressure fluid into each of said chambers whereby the respective gear and piston move apart in axial direction to engage the adjacent coupling members so that the respective gear is coupled with said shaft.

4. In a gear transmission, in combination, a shaft; a set of coupling members secured to said shaft; a set of gears mounted on said shaft for free rotation and for limited axial movement, and located between a pair of adjacent coupling members, each gear having a cylinder recess on either side; a pair of annular pistons respectively mounted in said cylinder recesses of each gear and forming a pair of chambers with the same; first and second means on each gear and on each respective piston, respectively, engaging each other for connecting the same for relative axial movement and for turning movement with each other; and means for selectively supplying a pressure fluid into each pair of chambers whereby the respective pistons move apart in axial direction to engage the adjacent coupling members so that the respective gear is coupled with said shaft.

5. In a gear transmission, in combination, a shaft; a set of coupling members secured to said shaft; a set of gears mounted on said shaft for free rotation and for limited axial movement, and located between a pair of adjacent coupling members, each gear having a cylinder recess on one side; an annular piston mounted in said cylinder recess of each gear and forming a chamber with the same; another annular piston on the other side of each gear; means for securing said other piston to said gear along a narrow zone so that said other piston is adapted to flexibly engage the adjacent coupling member; means on each gear and respective annular piston connecting the same for relative axial movement and for turning movement with each other; and means for selectively supplying a pressure fluid into each of said chambers whereby the respective gear and piston move apart in axial direction to engage the adjacent coupling members so that the respective gear is coupled with said shaft.

6. In a gear transmission, in combination, a shaft; a set of coupling members secured to said shaft; an inner race ring secured to said shaft between each pair of coupling members; roller means on each race ring; a set of gears having hubs forming outer race rings cooperating with said roller means so that said gears are mounted on said shaft for free rotation and for limited axial movement, and located between a pair of adjacent coupling members, each gear having a cylinder recess on one side and a coupling face on the other side thereof; at least one annular piston mounted in each gear in the respective cylinder recess and forming a chamber with the same; first and second driver means on each gear and on each respective piston, respectively, engaging each other for connecting the same for relative axial movement and for turning movement with each other; and means for selectively supplying a pressure fluid into each of said chambers whereby the respective gear and piston move apart in axial direction to engage the adjacent coupling members so that the respective gear is coupled with said shaft.

7. In a gear transmission, in combination, a hollow shaft having an inner axial bore and transverse axially spaced bores connecting said inner bore with the surface of said shaft; a set of coupling members secured to said shaft intermediate said transverse bores; an inner race ring secured to said shaft between each pair of coupling members and having a bore communicating with one of said transverse bores; roller means on each race ring; a set of gears having hubs forming outer race rings cooperating with said roller means so that said gears are mounted on said shaft for free rotation and for limited axial movement, and located between a pair of adjacent coupling members, each gear having a cylinder recess on one side and a coupling face on the other side thereof; at least one annular piston mounted in each gear in the respective cylinder recess and forming a chamber with the same; first and second driver means on each gear and on each respective piston, respectively, engaging each other for connecting the same for relative axial movement and for turning movement with each other; and means for selectively supplying a pressure fluid into each of said chambers including a valve movable in said inner bore between positions communicating with said transverse bores, respectively whereby the respective gear and piston move apart in axial direction to engage the adjacent coupling members so that the respective gear is coupled with said shaft.

8. A gear transmission as set forth in claim 7 and including a recess in the outer surface of said shaft surrounding each transverse bore; and an annular sealing ring in each recess surrounding said transverse bore.

9. In a gear transmission, in combination, a shaft; a set of coupling members secured to said shaft; a set of gears mounted on said shaft for free rotation and for limited axial movement, and located between a pair of adjacent coupling members, each gear having a cylinder recess on one side and a coupling face on the other side thereof; at least one annular piston mounted in each gear in the respective cylinder recess and forming a chamber with the same; first and second driver means on each gear and on each respective piston, respectively, engaging each other for connecting the same for relative axial movement and for turning movement with each other, said means including gear teeth on each gear and piston, and a ring of a deformable material having recesses matching said gear teeth and engaged by the same; and means for selectively supplying a pressure fluid into each of said chambers inwardly of said ring and teeth whereby the respective gear and piston move apart in axial direction to engage the adjacent coupling members so that the respective gear is coupled with said shaft.

10. In a gear transmisison, in combination, a shaft; a set of coupling members secured to said shaft; a set of gears mounted on said shaft for free rotation and for limited axial movement, and located between a pair of adjacent coupling members, each gear having a cylinder recess on one side and a coupling face on the other side thereof; at least one annular piston mounted in each gear in the respective cylinder recess and forming a chamber with the same; first and second driver means including projections and recesses on each gear and on each respective piston, respectively, engaging each other for connecting the same for relative axial movement and for turning movement with each other; a pair of annular dished springs engaging the outer faces of each gear and associated piston closing said chamber and urging said gear and piston toward each other; and means for selectively supplying a pressure fluid into each of said chambers whereby the respective gear and piston move apart in axial direction to engage the adjacent coupling members so that the respective gear is coupled with said shaft.

11. A gear transmission as set forth in claim 3 and including spring means secured to said gears and pistons for urging the latter toward said gears, and connecting said gears and pistons for rotation.

12. A gear transmission as set forth in claim 3 wherein said coupling members have confronting faces adapted to be engaged by said gears and pistons, said faces having portions formed with grooves for permitting passage of pressure fluid out of said gear transmission and other portions for closing said chambers.

13. A gear transmission as set forth in claim 7 including a sleeve mounted in said inner axial bore of said shaft and having on the outside thereof axially extending channels communicating with said transverse bores, respectively, said sleeve having transverse bores communicating with said channels and with the interior of said sleeve; and said valve including a tubular rod and a valve member secured to the same and having an opening for supplying pressure fluid to said transmission bores in said sleeve, said tubular rod and valve member being axially shiftable in said sleeve.

14. A gear transmission as set forth in claim 12 wherein said valve member has a pair of axially spaced sealing faces, said sealing faces having fine grooves having a cross section of about 0.001 to 0.05 square millimeter and being loops of a helical groove.

References Cited by the Examiner

UNITED STATES PATENTS

| | | | |
|---|---|---|---|
| 1,748,827 | 2/1930 | Boltshauser | 74—364 |
| 2,825,234 | 3/1958 | Papst | 74—364 |
| 3,061,058 | 10/1962 | Barth | 192—3.5 |
| 3,103,826 | 9/1963 | Jaeschke | 74—364 |

DON A. WAITE, *Primary Examiner.*

HENRY S. LAYTON, *Assistant Examiner.*